Patented May 7, 1940

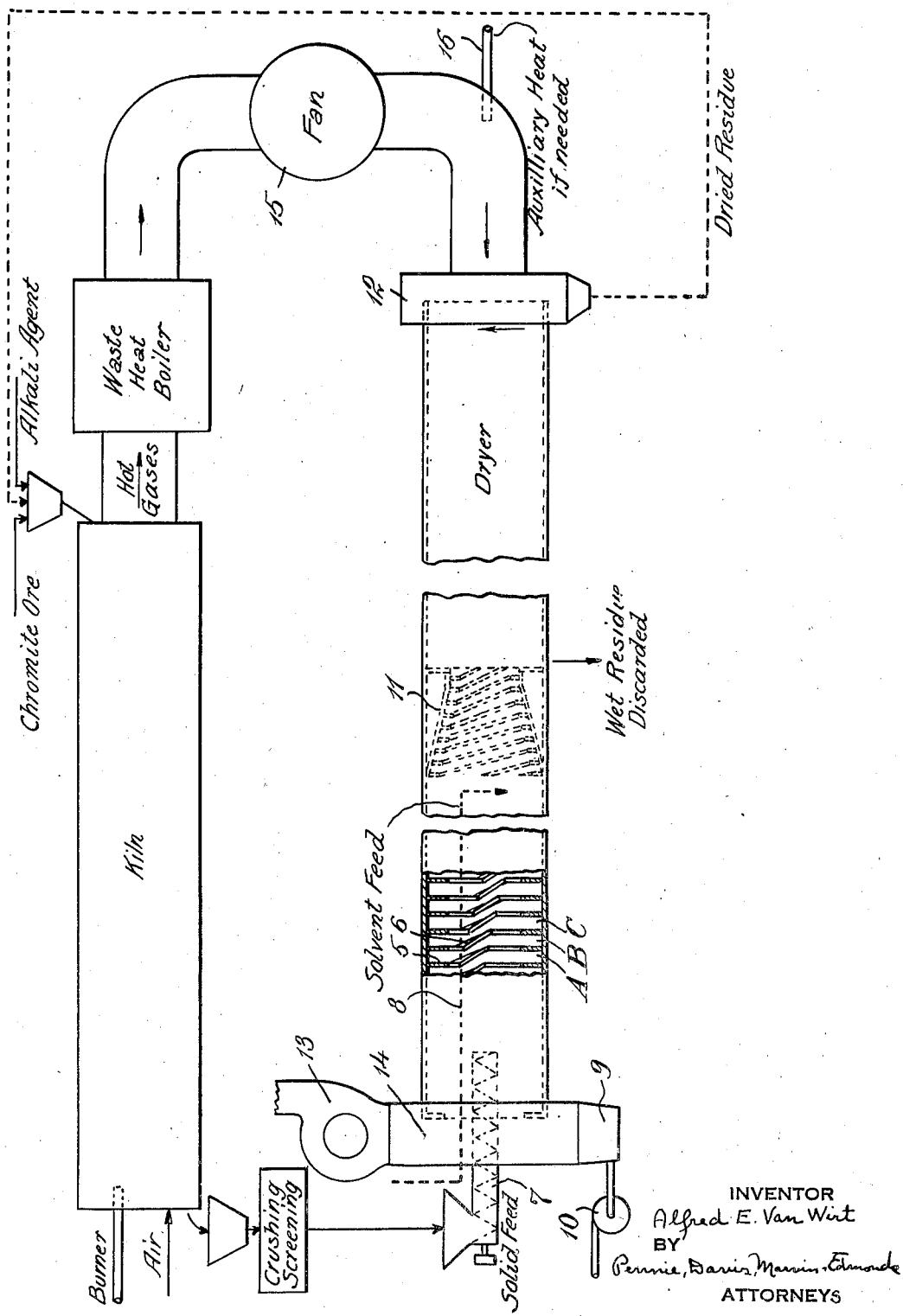

2,199,929

UNITED STATES PATENT OFFICE 2,199,929

MANUFACTURE OF SOLUBLE ALKALI CHROMATES

Alfred E. Van Wirt, Glens Falls, N. Y., assignor to Imperial Paper and Color Corporation, Glens Falls, N. Y., a corporation of New York Application February 9, 1938, Serial No. 189,636

2 Claims. (Cl. 23—56)

This invention relates to the manufacture of soluble alkali chromates, and has for its object the provision of certain improvements therein.

Soluble alkali chromates, such as sodium chromate, are made by roasting or calcining chromite ore, or the like, with an alkali agent, such as sodium carbonate (soda ash). The calcined product is leached with water (or weak solution from a preceding operation) to extract the soluble alkali chromate. The aqueous solution of alkali chromate is commonly used for the manufacture of bichromate of soda. It is desirable that the soluble alkali chromate be extracted from the calcined product in as small a volume of water as possible, so as to minimize the subsequent operations of evaporation etc. It is also desirable that the operations of calcining and extracting be carried out in a substantially continuous manner and in a closely articulated system. To attain these ends, the invention contemplates extracting the soluble alkali chromate from the calcined product by continuous countercurrent leaching, drying at least a portion of the extracted residue (preferably with hot waste gases from the calcining operation), and returning to the calcining operation at least part of the dried residue.

The foregoing and other novel features of the invention will be understood from the following description taken in connection with the accompanying drawing in which the single figure is a diagrammatic flow sheet of a system for practicing the invention in its preferred and complete aspect.

The calcination of the chromite ore with the alkali agent is advantageously carried out in a continuous manner in a rotary kiln or the like. The chromite ore and alkali agent, together with an appropriate amount of dried residue from the extracting operation, are charged into one end of the kiln and hot products of combustion, from oil burners or the like, are introduced into the other end of the kiln. The charge is moved through the kiln, by rotation thereof or in any other appropriate manner, and is heated in the presence of an excess of air or other oxidizing gas to a temperature in excess of about 1800° F. Air, preheated if desired, may be blown into the kiln along with the hot products of combustion, or the required excess of air may be obtained by including it in the air supplied to the oil burners, or the like, for combustion of the fuel utilized therein.

The product of the calcining operation contains the soluble alkali chromate (e. g. sodium chromate) admixed with iron oxide (and usually smaller amounts of other metal oxides) and perhaps other insoluble matter derived from the chromite ore, and from other agents that may be included in the kiln charge. The kiln product is in the form of a clinker and is usually crushed (and screened if desired) preparatory to the extracting or leaching operation. In a closely articulated system the clinker is continuously discharged from the kiln and is subjected to these preparatory operations in a substantially continuous manner, and the resulting crushed (and screened if desired) kiln product is then fed into the extractor by a screw conveyor or the like.

Continuous countercurrent leaching of the kiln product and drying of the extracted residue are preferably carried out in the apparatus described in my copending patent application Serial No. 189,635, filed February 9, 1938. This apparatus comprises an elongated cylinder mounted for rotation about its substantially horizontally-positioned longitudinal axis. The cylinder is divided into an extractor portion and a dryer portion. The extractor portion of the cylinder is internally divided into a number of operatively-communicating circumferential compartments (A, B, C etc.) by a series of spaced annular segments 5. The segments are arranged with the segmental spaces between their ends (that is the annularly incomplete portions of the segments) offset with respect to one another, and preferably positioned along an imaginary spiral concentric with the longitudinal axis of the cylinder. The two ends of each segment are operatively connected respectively to the oppositely-positioned ends of the two adjacent segments by deflecting or transfer strips 6 of slightly less depth than the depth of the segments.

The calcined kiln product is fed into one end of the extractor portion of the cylinder by a screw conveyor 7, and water (or weak solution) is introduced into the other end of this portion of the cylinder by permitting it to flow out of a supply pipe 8, preferably under appropriate volume control. The segmental spaces between the ends of the segments 5 provide means for the interchange of liquid solvent and solid material between adjacent compartments. The liquid level is maintained slightly below the level of the segments 5, and the solids level may conveniently be about half the liquid level. The liquid solvent moves by gravity through the extractor, leaching out the soluble alkali chromate as it moves along. The solid material is moved from one compartment to the next, each time mixing with liquid containing less soluble material, by the transfer strips 6, so arranged as to guide the solid material into the next compartment as the cylinder rotates. The depth of the transfer strip is such as to move from one compartment to the next the desired amount of solid material.

The continuous countercurrent leaching action which takes place in the extractor portion of the cylinder will be best understood by considering the actions taking place in three adjacent compartments (A, B and C) as the cylinder slowly rotates in the direction of the arrow. Assume that a charge of solid material has just been received in compartment B from compartment A, and that the segmental space of the annular segment between compartments A and B has just risen above the liquid level. The liquid and solvent are now confined in compartment B and isolated from the other materials in the cylinder by the annular segments which rise above the liquid level. Rotation of the cylinder tumbles the solid material over and at the same time agitates the liquid. The liquid dissolves out some of the soluble material, thus becoming more concentrated. This action continues for about 300° of rotation. The segmental space between the compartments A and B then enters the liquid level. Liquid immediately starts flowing out of compartment B into compartment A, and shortly thereafter liquid begins to flow from compartment C into compartment B. The amount of overlapping of these liquid flows depends on the angular displacement of the segmental spaces. As rotation continues, compartment B begins to receive (on one side of the deflecting strip secured to the annular segments forming the compartment B) solid material from compartment A and then to deliver solid material (from the other side of this deflecting strip) to compartment C. As the segmental spaces (of the annular segments forming compartment B) rise above the liquid level, the flow of liquid ceases. The transfer of solids ceases shortly afterwards and the cycle is repeated.

The solution discharged from the extractor is collected in an appropriate tank 9, from which it is withdrawn by a pump 10. The solution may be further clarified, if desired, by sedimentation, filtration etc. The solid material resulting from such subsequent clarifying operations may frequently be advantageously worked back into the rotating cylinder along with the solids feed.

The residual or extracted solids are removed from the extractor portion of the cylinder by a hollow conical frustrum discharge 11. Solid material delivered to the base of the conical frustrum from the adjacent agitating compartment of the extractor moves up the conical surface and is discharged into the dryer portion of the cylinder. If desired, a portion of the wet residue may be removed from the extractor and discarded, thereby necessitating the drying of only that part of the wet residue which is to be subsequently returned to the calcining operation, as hereinafter described.

The hot waste gases from the calcining kiln, having a temperature around 1800° F., may advantageously be first passed through waste heat boilers to extract therefrom a certain amount of available heat. From the waste heat boilers, the hot gases (at a temperature of about 800° F.) are delivered to the dry solids discharge end of the rotating extractor-dryer through a sealed hood 12 and are drawn through the cylinder by a fan 13 operatively associated with a sealed hood 14 at the opposite end of the cylinder. If necessary, an auxiliary fan 15 may be included in the flue between the waste heat boilers and the dryer. In the event that too much heat is extracted from the hot kiln gases by the waste heat boilers, additional heat may be imparted to the gases delivered to the dryer by an auxiliary fuel burner 16.

The calcined product is leached in the extractor portion of the cylinder, as hereinbefore described, and the extracted wet residue is delivered to the dryer portion of the cylinder. Here the residue meets the hot gases from the kiln, and these gases after drying the residue pass into the extractor portion of the cylinder and impart heat to the contents thereof. A temperature of slightly less than 200° F. is maintained in the extractor, principally by heat derived from the exhaust kiln gases. Dust carried by the hot kiln gases is largely removed by the wet surfaces in the extractor portion of the cylinder. Thus, waste heat from the kiln is utilized to dry the extracted residue and to keep the extractor warm.

The dried residue discharged from the dryer portion of the cylinder is delivered, in part at least, to the calcining kiln, along with the chromite ore and alkali agent. The dried residue consists principally of iron and other metallic oxides and constitutes a valuable ingredient of the charge fed to the calcining kiln in that it substantially prevents fusion of the charge during the calcining operation. Generally, about two-thirds of the residual solids discharged from the extractor may be (after drying) advantageously returned to the calcining operation. Unless the remaining third of the extractor residue can be economically utilized, it is usually uneconomical to dry it, and in that event approximately one-third of the wet residue of the extractor is removed from the extractor portion of the cylinder and discarded, so that only two-thirds of the wet residue of the extractor is delivered to the dryer.

The invention, in its preferred and complete aspect, provides a substantially continuous and closely articulated process of producing a concentrated aqueous solution of alkali chromate from chromite ore, or the like. Chromite is essentially a chrome iron ore ($Cr_2O_3FeO$), and frequently contains considerable amounts of aluminum, magnesium and calcium oxides and a small amount of silica. Throughout this specification and the appended claims chromite ore is used generically to include equivalent oxidized compounds of chromium and iron available for the production of alkali chromates by calcination with an alkali agent.

I claim:

1. In the leaching of a solid product containing a chromate the improvement which comprises subjecting separate portions of the solid product to isolated extractions with separate bodies of solvent, each body of solvent in a series of rotating compartments passing progressively from one portion of the solid product in one compartment to another portion of solid product in another compartment, and while the solvent is passing from one portion of solid to another, other portions of the solid product are undergoing isolated extractions in other compartments in which the solid and solvent undergo agitation.

2. The cyclic method of producing alkali chromates which comprises calcining chromite ore with an alkali compound, subjecting the calcined product to a leaching treatment in a series of rotating compartments in which portions of the product are passed from one compartment to another and subjected successively to separate bodies of solvent of progressively decreasing alkali chromate content, the portions of the product moving countercurrent to the separate bodies of solvent and the solvent moving from one portion of the product to another while the other portions of the product and bodies of solvent are isolated in compartments disconnected for the exchange of solid or solvent, drying at least a portion of the residue from the leaching treatment with hot gases from the calcining operation, and returning to the calcining operation at least a portion of the dried residue.

ALFRED E. VAN WIRT.